United States Patent
Fukatsu et al.

(10) Patent No.: US 11,826,865 B2
(45) Date of Patent: Nov. 28, 2023

(54) MACHINE TOOL MACHINING DIMENSIONS PREDICTION DEVICE, MACHINE TOOL EQUIPMENT ABNORMALITY DETERMINATION DEVICE, MACHINE TOOL MACHINING DIMENSIONS PREDICTION SYSTEM, AND MACHINE TOOL MACHINING DIMENSIONS PREDICTION METHOD

(71) Applicant: Mitsubishi Electric Corporation, Tokyo (JP)

(72) Inventors: Noriyasu Fukatsu, Tokyo (JP); Tetsushi Ishida, Tokyo (JP); Kiyofumi Takeuchi, Tokyo (JP); Osamu Nasu, Tokyo (JP); Yoshiyuki Hattori, Tokyo (JP); Mariko Nishino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 525 days.

(21) Appl. No.: 17/050,857

(22) PCT Filed: Jun. 15, 2018

(86) PCT No.: PCT/JP2018/023041
§ 371 (c)(1),
(2) Date: Oct. 27, 2020

(87) PCT Pub. No.: WO2019/239606
PCT Pub. Date: Dec. 19, 2019

(65) Prior Publication Data
US 2021/0229231 A1    Jul. 29, 2021

(51) Int. Cl.
*G05B 19/418* (2006.01)
*B23Q 17/20* (2006.01)
*B23Q 17/09* (2006.01)

(52) U.S. Cl.
CPC ........ *B23Q 17/20* (2013.01); *B23Q 17/0952* (2013.01); *B23Q 17/0995* (2013.01);
(Continued)

(58) Field of Classification Search
None
See application file for complete search history.

(56) References Cited

U.S. PATENT DOCUMENTS 5,283,418 A * 2/1994 Bellows .............. B23K 31/006
                                            219/130.01
5,465,221 A * 11/1995 Merat ................... G01B 5/008
                                              706/904
(Continued)

FOREIGN PATENT DOCUMENTS

JP    5-27827 A    2/1993
JP    7-36530 A    2/1995
(Continued)

OTHER PUBLICATIONS

International Search Report and Written Opinion dated Sep. 11, 2018 for PCT/JP2018/023041 filed on Jun. 15, 2018, 12 pages including English Translation of the International Search Report.
(Continued)

*Primary Examiner* — Jason Lin
(74) *Attorney, Agent, or Firm* — XSENSUS LLP

(57) ABSTRACT

A machine tool machining dimensions prediction device (100) includes: a data collector (10) to acquire driving state information of a machine tool; a feature amount extractor (211) to extract a feature amount from the driving state information; a data analyzer (311) to analyze the extracted feature amount; and a machining quality prediction model generator (312) to generate, from the analyzed information, a prediction model of a machining dimension of a workpiece. The machine tool machining dimensions prediction
(Continued)

device (100) applies the feature amount and the driving state information to the prediction model during machining of the workpiece to predict a machining quality and refers to a machining dimension quality regulation to determine whether the machining quality satisfies a standard.

12 Claims, 14 Drawing Sheets

(52) U.S. Cl.
CPC .. *G05B 19/41875* (2013.01); *B23Q 2717/006* (2013.01); *G05B 2219/32194* (2013.01); *G05B 2219/37252* (2013.01)

(56) References Cited

U.S. PATENT DOCUMENTS

| | | | | |
|---|---|---|---|---|
| 5,579,232 | A * | 11/1996 | Tong | G05B 19/4065 706/912 |
| 6,041,271 | A * | 3/2000 | Lindstrom | G05B 19/4065 700/175 |
| 6,311,098 | B1 * | 10/2001 | Higasayama | G05B 19/4099 711/159 |
| 6,884,204 | B2 * | 4/2005 | Watanabe | B23Q 3/152 409/188 |
| 7,778,724 | B2 * | 8/2010 | Ikeda | G05B 19/406 82/163 |
| 10,295,986 | B2 * | 5/2019 | Saitou | G06N 20/00 |
| 10,525,563 | B2 * | 1/2020 | Yamamoto | G05B 13/0265 |
| 2004/0179915 | A1 * | 9/2004 | Hill | B23Q 17/0971 409/141 |
| 2008/0082200 | A1 | 4/2008 | Ikeda | |
| 2009/0247049 | A1 * | 10/2009 | Inoue | G05B 19/401 451/5 |
| 2010/0329081 | A1 * | 12/2010 | Sullivan | G01N 29/265 175/432 |
| 2015/0370243 | A1 | 12/2015 | Fukatsu | |
| 2016/0091890 | A1 | 3/2016 | Fukatsu | |
| 2017/0060356 | A1 | 3/2017 | Oota et al. | |
| 2017/0090430 | A1 | 3/2017 | Nakazawa | |
| 2017/0315540 | A1 * | 11/2017 | Nishioka | G05B 19/41865 |
| 2018/0067471 | A1 | 3/2018 | Saitou et al. | |

FOREIGN PATENT DOCUMENTS

| | | |
|---|---|---|
| JP | 2008-87095 A | 4/2008 |
| JP | 5512051 B1 | 6/2014 |
| JP | 5875737 B1 | 3/2016 |
| JP | 2017-45323 A | 3/2017 |
| JP | 2017-64837 A | 4/2017 |
| JP | 2018-41208 A | 3/2018 |

OTHER PUBLICATIONS

Office Action dated Jan. 18, 2022, in corresponding Chinese patent Application No. 201880094561.9, 32 pages.
Chinese Office Action dated Jun. 16, 2022, in Chinese patent Application No. 201880094561.9.

* cited by examiner

FIG.2B

| PROCESS "3", SECTION "1" | | START MARK |
|---|---|---|
| TIME | DATA TYPE | MEASURED DATA |
| ⋮ | ⋮ | ⋮ |
| PROCESS "3", SECTION "1" | | END MARK |

MACHINE TOOL MACHINING DIMENSIONS PREDICTION DEVICE, MACHINE TOOL EQUIPMENT ABNORMALITY DETERMINATION DEVICE, MACHINE TOOL MACHINING DIMENSIONS PREDICTION SYSTEM, AND MACHINE TOOL MACHINING DIMENSIONS PREDICTION METHOD

CROSS-REFERENCE TO RELATED APPLICATION

The present application is based on PCT filing PCT/JP2018/023041, filed Jun. 15, 2018, the contents of which are incorporated by reference herein in its entirety.

TECHNICAL FIELD

The present disclosure relates to a machine tool machining dimensions prediction device, a machine tool equipment abnormality determination device, a machine tool machining dimensions prediction system, and a machine tool machining dimensions prediction method.

BACKGROUND ART

A machine tool is a machine for performing processing such as cutting, machining, and polishing on a workpiece (an object to be machined). Milling machines, lathes, drilling machines and the like are known as the machine tool.

Many machine tools are automated. Among automated machine tools, a numerically controlled (NC) machine tool is a machine tool that performs machining on a workpiece using an NC machining method. The NC machine tool includes an NC device and drives a tool or the workpiece based on machining operation information to machine the workpiece.

The NC machine tool can achieve precise machining. However, a difference between an intended dimension and an actual dimension of the workpiece may occur due to fluctuations in and deteriorations of states of mechanical equipment and tools, fluctuations in work environment, and the like. Accordingly, a technique for predicting the actual dimension or an amount of the difference or for suppressing the amount of the difference is proposed.

For example, Patent Literature 1 discloses a machining dimension prediction apparatus for a machine tool that includes a neural network. This machining dimension prediction apparatus detects a vibration of a drive device that rotates a tool, learns a feature amount of the vibration and machining accuracy using the neural network, and predicts a machining dimension of a workpiece.

Patent Literature 2 discloses a machine tool including a machine learning device. This machine learning device learns an operation command in accordance with (i) a state variable such as an amount of power supplied to an electric motor, a temperature of the electric motor, and a load, (ii) a correction value of the operation command, and (iii) a result of determination as to whether an abnormality occurs, thereby performing appropriate correction processing to improve processing accuracy. This Literature also discloses the use of a neural network.

Patent Literature 3 discloses a machining condition automatic adjustment device including a machining condition inference device that performs fuzzy inference. This machining condition inference device applies the fuzzy inference to load status data and machining condition data and continuously corrects a machining condition such as a rotational speed of a tool.

CITATION LIST

Patent Literature

Patent Literature 1: Unexamined Japanese Patent Application Publication No. 2008-087095
Patent Literature 2: Unexamined Japanese Patent Application Publication No. 2017-64837
Patent Literature 3: Unexamined Japanese Patent Application Kokai Publication No. H07-36530

SUMMARY OF INVENTION

Technical Problem

The machine tool disclosed in Patent Literature 1 performs learning using the neural network. Accordingly, when the number of types of tools increases, the number of neurons necessary for learning increases, learning is not completed properly, and machining conditions vary. Thus, the machine tool disclosed in Patent Literature 1 cannot stably predict quality of the workpiece. In addition, this apparatus has a problem in that the apparatus can merely predict a fluctuation in quality due to a mounting state of the tool and cannot accurately predict the machining dimension.

The machine tool disclosed in Patent Literature 2 also learns using the neural network. Accordingly, the machine tool of Patent Literature 2 has a problem similar to that of Patent Literature 1. Also, the machine tool disclosed in Patent Literature 2 monitors a state variable such as the amount of power supplied to the electric motor and constantly updates parameters of a learning unit to correct a rotational frequency, position and the like of the electric motor. Thus, the machine tool of Patent Literature 2 has a problem in that machining conditions are not constant and quality of the workpiece cannot be stably predicted.

The machining condition automatic adjustment device disclosed in Patent Literature 3 corrects a machining condition by the fuzzy inference. Accordingly, there is no guarantee that the machining condition is set appropriately, and the device of Patent Literature 3 has a problem in that quality of the workpiece cannot be stably predicted.

In order to solve the aforementioned problem, an objective of the present disclosure is to provide a machine tool machining dimensions prediction device that can stably and precisely predict a machining dimension of a workpiece.

Solution to Problem

In order to achieve the aforementioned objective, a machine tool machining dimensions prediction device according to the present disclosure includes (i) a driving state information acquirer to acquire driving state information about a driving state of a machine tool, (ii) a feature amount extractor to extract a feature amount from the driving state information, (iii) a data analyzer to analyze the extracted feature amount and output feature amount analysis information, and (iv) a machining quality prediction model generator to generate, from the feature amount analysis information, a prediction model of a machining dimension of a workpiece to be machined by the machine tool.

Advantageous Effects of Invention

According to the present disclosure, the dimension of the workpiece can be stably predicted during driving of the machine tool and machining of the workpiece.

BRIEF DESCRIPTION OF DRAWINGS

FIG. 2B is a view illustrating an example of machining data;

DESCRIPTION OF EMBODIMENTS

Embodiment 1

A machine tool machining dimensions prediction device according to Embodiment 1 of the present disclosure and an NC machine tool including the machining dimensions prediction device are described below with reference to the drawings.

Figure 1:
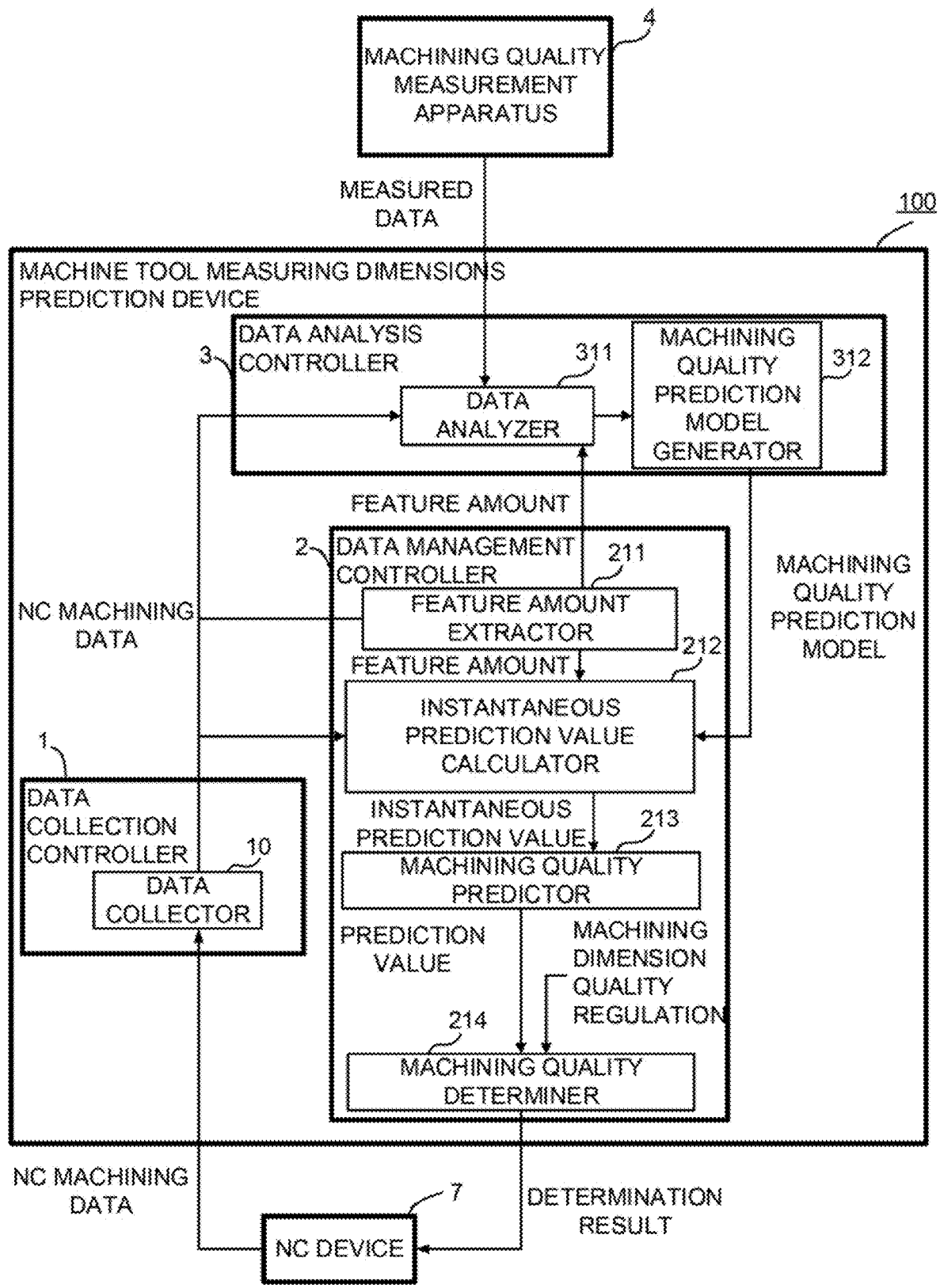
FIG. 1 is a functional block diagram of a machine tool machining dimensions prediction device according to Embodiment 1 of the present disclosure.

As illustrated in FIG. 1, a machine tool machining dimensions prediction device 100 according to Embodiment 1 includes (i) a data collection controller 1 that collects NC machining data, (ii) a data management controller 2 that predicts machining quality of a workpiece using a machining quality prediction model, and (iii) a data analysis controller 3 that generates the machining quality prediction model.

The data collection controller 1 includes a data collector 10. The data collector 10 is connected to an NC device 7 and the data management controller 2.

The data collector 10 collects NC machining data from the NC device 7, temporarily stores the NC machining data, and supplies, to the data management controller 2, a certain amount of data all together.

The NC machining data collected by the data collector 10 includes machining process data and state data indicating an operating state of the NC device 7. The machining process data includes data indicating which machining process of NC machining is currently performed and which machining section is currently machined in the currently-performed machining process. On the other hand, the state data includes data indicating the operating state itself of the NC device 7 and data indicating a state of operating environment, and the state data includes data indicating a state of a main body of the NC device 7 and data acquired by a sensor disposed in the NC device 7. In the following description, the state data are assumed to be a current value of the drive current of a main spindle motor that rotates a main spindle, vibration data output by a vibration sensor attached to the main spindle motor, and temperature data output by a temperature sensor attached to the main spindle motor. These data may be different from one another in sampling timing and sampling period. The NC machining data is an example of driving state information specified in the claims.

Figure 2A:
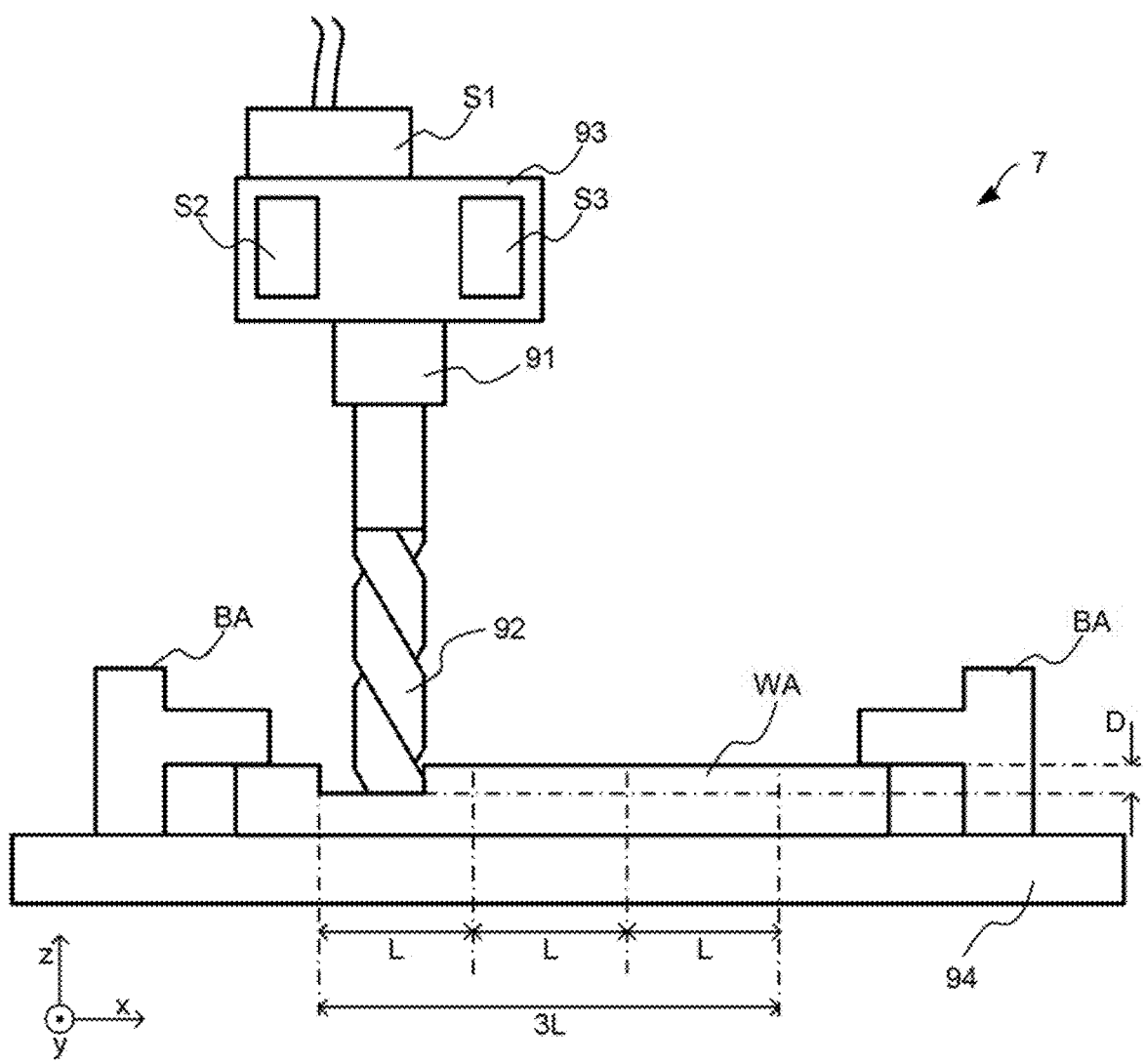
FIG. 2A is a view illustrating an example of machining of a workpiece.

A structure of the NC machining data collected and output by the data collector 10 is described with reference to a specific example. In this embodiment, as a simplified example, as illustrated in FIG. 2A, the NC device 7 is assumed to be a milling machine having a structure in which a tool 92 is attached to the main spindle 91 extending in the vertical direction by a collet chuck. With the workpiece WA fixed on a table 94, the tool 92 cuts a region of the workpiece WA having a length 3 L in the x-axis direction with a depth D, that is, such that a cutting amount in the z-axis direction is equal to D, thereby forming a linear groove having a certain depth.

The workpiece WA is gripped on the table 94 by a vise BA. The region of a machining target portion of the workpiece WA having a length of 3 L is assumed to be divided into three machining sections each having a length of L. Also, a current sensor S1, the vibration sensor S2, and the temperature sensor S3 are attached to the main spindle motor 93 that rotates the main spindle 91 to which a blade is attached. The current sensor S1 measures a current value of the drive current of the main spindle motor 93 and supplies the measured data to the NC device 7. The vibration sensor S2 measures vibration data on a vibration of the main spindle motor 93 and supplies the measured vibration data to the NC device 7. The temperature sensor S3 measures temperature data on a temperature of the main spindle motor 93 and supplies the measured temperature data to the NC device 7. The NC device 7 assigns a collection time and a data type to the measured data and transmits the measured data to the data collector 10. In the description made below with reference to FIG. 2A, a region having a length of L may be expressed as a region L, and a region having a length of 3 L may be expressed as a region 3 L.

The data collector 10 groups the supplied measured data for each process section. As illustrated in FIG. 2B, a data group includes: a set of (i) a process ID indicating a start time of machining on a machining section, (ii) a section ID, and (iii) a start mark; a set of a subsequent time, a data type and a measured data; and a set of (i) a process ID indicating an end time of the machining on the machining section, (ii)

a section ID, and (iii) an end mark. The data collector 10 transmits the generated data group to the data management controller 2. In FIG. 2B, one row corresponds to one set.

A process "3" illustrated in FIG. 2B indicates that the process ID is "3", and a section "1" indicates that the machining section is "1". That is, the section "1" indicates that the machining section is the first machining section L that has a length of L and is in the machining section that is illustrated in FIG. 2A and has a length of 3 L.

The data management controller 2 illustrated in FIG. 1 includes (i) a feature amount extractor 211 that extracts feature amounts of NC machining data, (ii) an instantaneous prediction value calculator 212 that obtains instantaneous prediction values of a machining quality from the feature amounts, (iii) a machining quality predictor 213 that predicts, based on a series of the instantaneous prediction values, quality of a final product obtained by machining, and (iv) a machining quality determiner 214 that determines whether the quality is acceptable or rejected.

The feature amount extractor 211 extracts the feature amounts from the NC machining data for each machining section that is supplied from the data collector 10 of the data collection controller 1. The feature amounts are, for example, the same kind of NC machining data collected in one machining section, for example, the maximum value, the minimum value, the average value, the standard deviation, the numerical range, the machining time, an integral value, and the like of the current value.

The instantaneous prediction value calculator 212 applies, to the machining quality prediction model supplied from the data analysis controller 3, (i) the NC machining data supplied from the data collector 10 and (ii) the feature amounts supplied from the feature amount extractor 211, thereby performing an arithmetic operation to obtain an instantaneous value of machining quality of the workpiece WA that is in the middle of being processed.

The instantaneous value of the machining quality corresponds to an example of predication dimension information recited in the claims.

The machining quality predictor 213 predicts, based on a series of machining quality data supplied from the instantaneous prediction value calculator 212 until that point of time, the final machining quality of the workpiece WA at a time of completion of the machining.

The machining quality determiner 214 (i) determines whether the final machining quality of the workpiece WA predicted by the machining quality predictor 213 satisfies a quality standard defined in a machining dimension quality regulation and (ii) outputs a result of the determination to the NC device 7.

This quality standard corresponds to an example of quality regulation information recited in the claims.

Also, the data collector 10 functions as an example of a driving state information acquirer recited in the claims. The machining quality predictor 213 functions as an example of a quality predictor recited in the claims.

On the other hand, the data analysis controller 3 includes (i) a data analyzer 311 that analyzes the feature amounts, and (ii) a machining quality prediction model generator 312 that generates, from the analyzed feature amounts, the machining quality prediction model described later.

The data analyzer 311 refers to the NC machining data supplied from the data collector 10, thereby excluding, from the feature amounts extracted by the feature amount extractor 211, an abnormal value that is not suitable for model generation. For example, the data analyzer 311 performs analysis processing such as (i) a division for correspondence to any one of a plurality of steps constituting the machining process and (ii) generation of an analysis model.

The machining quality prediction model generator 312 uses (i) the feature amounts supplied from the data analyzer 311 and (ii) measured values supplied from a machining quality measurement apparatus 4 to obtain a machining quality prediction model in which the feature amounts are denoted by an explanatory variable x and the measured value are denoted by a target variable y. In this embodiment, the machining quality prediction model is assumed to be a regression line by the least square method. The machining quality prediction model generator 312 supplies the generated machining quality prediction model to the instantaneous prediction value calculator 212 of the data management controller 2, and a tendency of the machining quality is determined using a curve-fitting curve including a straight line.

The data analyzer 311 functions as an example of an analyzer recited in the claims. Also, the data analyzed by the data analyzer 311 corresponds to an example of feature amount analysis information recited in the claims.

Figure 3A:
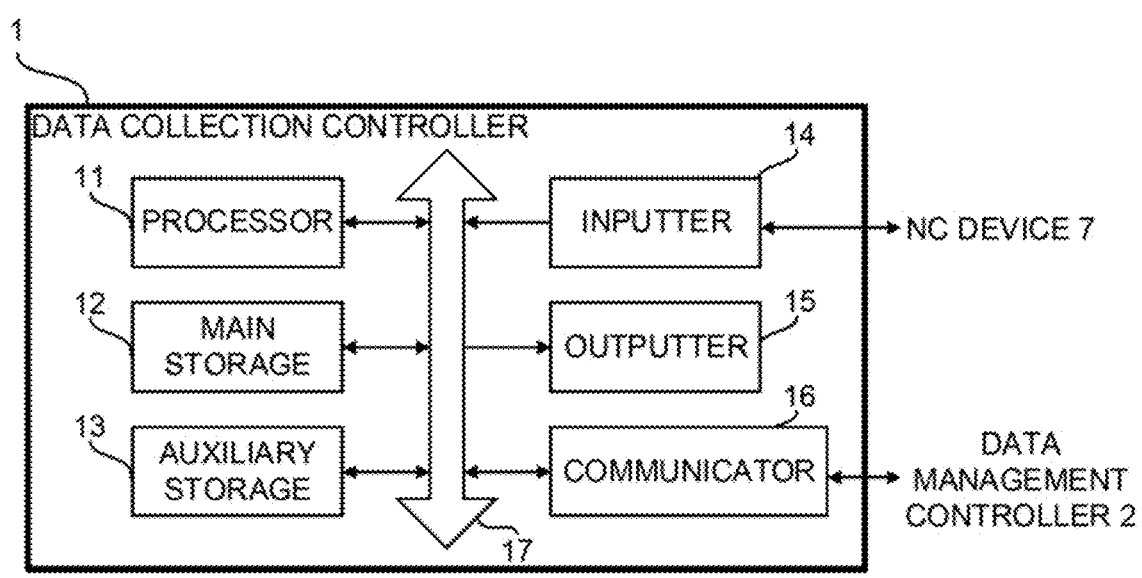
FIG. 3A is a block diagram of a data collection controller illustrated in FIG. 1.

As illustrated in FIG. 3A, in terms of a hardware configuration, the data collection controller 1 includes (i) a processor 11 that processes data in accordance with a control program, (ii) a main storage 12 that functions as a work area of the processor 11, an auxiliary storage 13 for storing data over a long period, (iv) an inputter 14 that receives a data input, (v) an outputter 15 that outputs data, (vi) a communicator 16 that communicates with another device, and (vii) a bus 17 that interconnects these components with one another.

The auxiliary storage 13 stores a control program for data collection processing executed by the processor 11. The content of the control program is described later.

The inputter 14 receives the NC machining data transmitted from the NC device 7 and supplies the NC machining data to the processor 11.

The communicator 16 communicates with the data management controller 2 and transmits the NC machining data.

The main storage 12 or the auxiliary storage 13 functions as an example of a prediction model storage recited in the claims. The communicator 16 functions as an example of a prediction model acquirer recited in the claims.

Figure 3B:
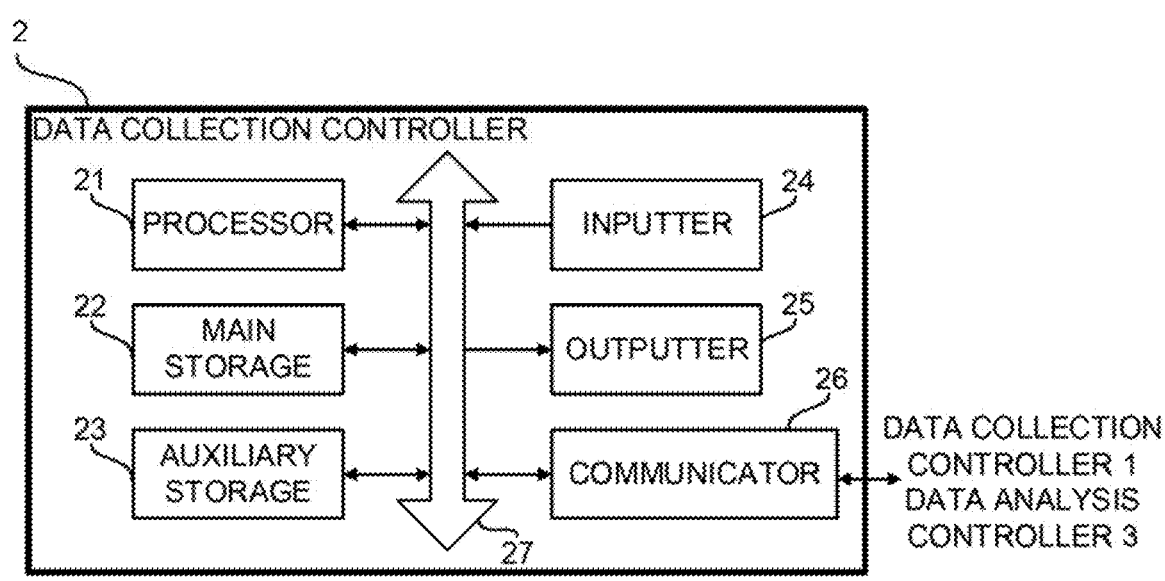
FIG. 3B is a block diagram of a data management controller illustrated in FIG. 1.

On the other hand, as illustrated in FIG. 3B, the data management controller 2 illustrated in FIG. 1 is similar to the data collection controller 1 in terms of hardware configuration, and the data management controller 2 includes a processor 21, a main storage 22, an auxiliary storage 23, and an inputter 24, an outputter 25, a communicator 26, and a bus 27. The auxiliary storage 23 stores a control program for quality prediction processing executed by the processor 21. The content of the control program is described later. The communicator 26 is connected to and communicates with the data collection controller 1 and the data analysis controller 3.

The main storage 12 or the auxiliary storage 13 functions as an example of the prediction model storage or a machining condition storage recited in the claims. The communicator 16 functions as an example of the prediction model acquirer recited in the claims.

Figure 3C:
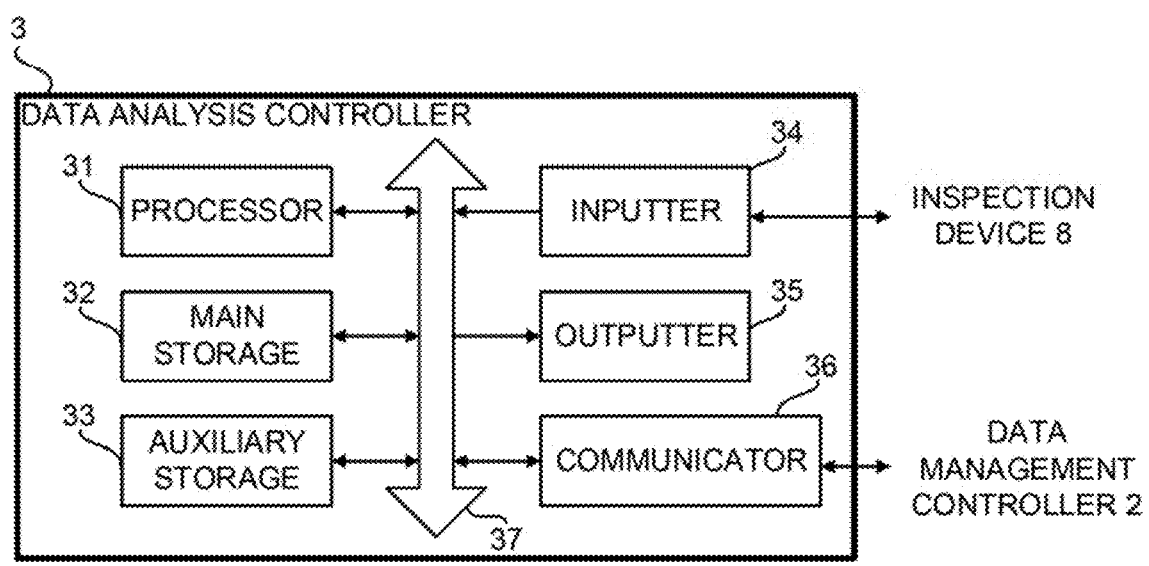
FIG. 3C is a block diagram of a data analysis controller illustrated in FIG. 1.

Also, in terms of hardware configuration, the data analysis controller 3 illustrated in FIG. 1 is similar to the data collection controller 1 and the data management controller 2 as illustrated in FIG. 3C, and the data analysis controller 3 includes a processor 31, a main storage 32, an auxiliary storage 33, an inputter 34, an outputter 35, a communicator 36, and a bus 37. The auxiliary storage 33 stores a control program for prediction model generation processing executed by the processor 31. The content of the control program is described later. The inputter 34 receives inspection data transmitted from an inspection device 8 and supplies the inspection data to the processor 31. The communicator 36 is connected to the data management controller 2 and communicates with these components.

The main storage 12 or the auxiliary storage 13 functions as an example of the prediction model storage recited in the claims. The communicator 16 functions as an example of the prediction model acquirer recited in the claims.

Each of the data collection controller 1, the data management controller 2, and the data analysis controller 3 are preferably an industrial computer. However, a consumer computer may be used instead of the industrial computer. Also, one computer may also serve as all of the data collection controller 1, the data management controller 2, and the data analysis controller 3.

Figure 4:
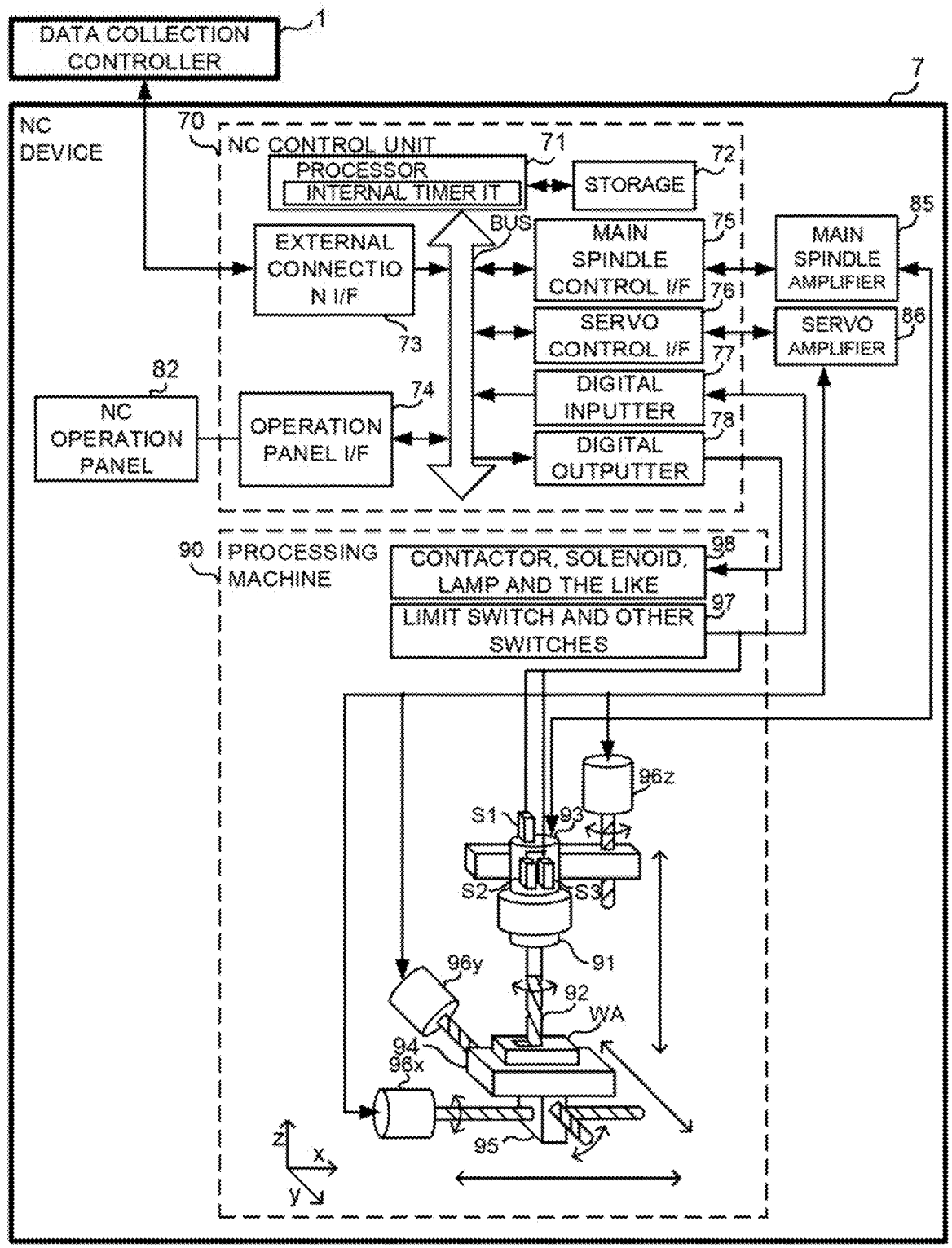
FIG. 4 is a functional block diagram of a NC device illustrated in FIG. 1.

Next, a configuration of the NC device 7 is described with reference to FIG. 4.

The NC device 7 includes (i) an NC control unit 70 that processes NC data and outputs a control signal, and (ii) a machining apparatus 90 that machines the workpiece WA in accordance with the control signal from the NC control unit 70.

The machining apparatus 90 includes (i) the main spindle 91, (ii) the tool 92 attached to the main spindle 91, (iii) the main spindle motor 93 that rotates the main spindle 91, (iv) the table 94 that fixes the workpiece WA, (v) a moving mechanism 95 that moves the table 94, (vi) two servo motors 96x and 96y that adjust positions of the moving mechanism 95 in the x-axis and y-axis directions, and (vii) a servo motor 96z that adjusts a position of the main spindle motor 93 in the z-axis direction. A drive current is supplied to the main spindle motor 93 from a main spindle amplifier 85, and drive currents are supplied to the servo motors 96x, 96y, and 96z from a servo amplifier 86. The positions of the tool 92 relative to the workpiece WA in the x-axis, y-axis, and z-axis directions can be independently controlled by the servo motors 96x, 96y, and 96z.

The main spindle motor 93 is provided with the current sensor S1, the vibration sensor S2, and the temperature sensor S3.

The machining apparatus 90 also includes (i) components 98 such as a contactor, a solenoid and a lamp and (ii) other switches 97 for limit switches and sensors that detect the state of each part in the machining apparatus 90 and output a detection signal.

The NC control unit 70 includes (i) a processor 71 that processes information, (ii) a storage 72 that stores data, (iii) an external connection interface 73 connected to the data collection controller 1 (hereinafter, interfaces are referred to as "I/F"), (iv) an operation panel I/F 74 connected to an NC operation panel 82, (v) a main spindle control I/F 75 connected to the main spindle amplifier 85, and (vi) a servo control I/F 76 connected to the servo amplifier 86.

The processor 71 (i) supplies a drive signal to the main spindle amplifier 85 via the main spindle control I/F 75 in accordance with a numerical control program and numerical information that are stored in the storage 72 to drives the main spindle motor 93 and (ii) supplies drive signals to the servo amplifier 86 via the servo control I/F 76 to drive the servo motors 96x, 96y, and 96z, thereby rotationally driving the main spindle 91 to position the tool 92 and cutting the workpiece WA.

Also, a digital inputter 77 (i) inputs data from the current sensor S1, the vibration sensor S2, the temperature sensor S3, and the other switches 97 for the limit switch and the sensor and (ii) supplies the data to the processor 71. The processor 71 stores these data in the storage 72. Also, the processor 71 transmits the data from the sensors S1 to S3 to the data collection controller 1 via the external connection I/F 73.

The external connection I/F 73 performs data communication with an external device. In particular, in the present embodiment, the external connection I/F 73 (i) adds time data and type data to the data output by the sensors S1 to S3 under the control of the processor 71 and (ii) transmits the data to the data collection controller 1.

The operation panel I/F 74 is connected to an NC operation panel 82 including a display, a key operation unit, and the like, and the operation panel I/F 74 (i) transmits display data to the NC operation panel 82, (ii) receives key operation signals from the NC operation panel 82, and (iii) notifies the processor. 71.

Also, the NC control unit 70 includes (i) the digital inputter 77 that receives a digital signal from the machining apparatus 90, (ii) a digital outputter 78 that transmits a digital signal to the machining apparatus 90, and (iii) an internal timer IT that is built in the processor 71.

Next, operations of the machining dimensions prediction device 100 and the NC device 7 that have the above-described configurations are described.

The operation of the machining dimensions prediction device 100 includes (i) a learning process of learning the relationship between an operating state of the NC device 7 and the machining quality to generate the machining quality prediction model, and (ii) a process of predicting a machining quality during a process of actually machining the workpiece WA.

First, the learning process is described.

First, the workpiece WA is fixed on the table 94 of the NC device 7, and machining of the workpiece WA is actually started using preset numerical data.

On the other hand, the processor 71 transmits, to the data collection controller 1 via the external connection I/F 73, data indicating (i) a process that is in the middle of being executed and (ii) a machining section. In parallel, the processor 71 (i) collects data from the sensors S1 to S3 via the digital inputter 77, (ii) assigns, to the data, time data acquired from the internal timer IT and type data indicating the data type, and (iii) transmits the data to the data collection controller 1 via the external connection I/F 73.

Figure 5:
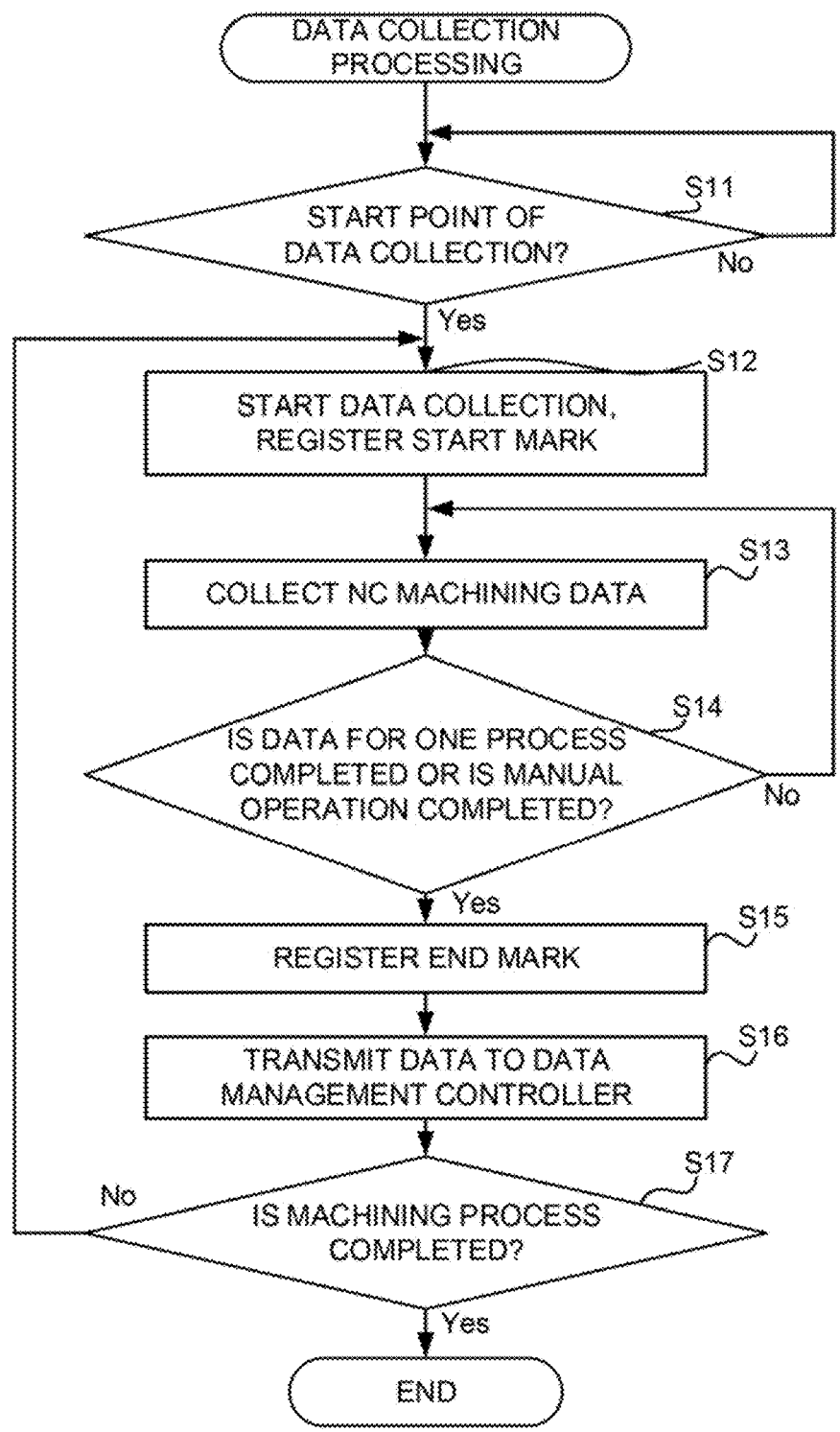
FIG. 5 is a flow chart illustrating data collection processing performed by the data collection controller illustrated in FIG. 1.

On the other hand, the processor 71 activates the machining dimensions prediction device 100 via the external connection I/F 73 and instructs the data collection controller 1 to start data collection. In response to this instruction, the processor 11 of the data collection controller 1 starts the data collection processing illustrated in FIG. 5.

First, the processor 11 stands by until the machining in the NC device 7 reaches a start point of data collection (step S11).

When the machining process in the NC device 7 progresses and machining of the first machining section is started, the processor 11 (i) starts collecting data supplied from the NC device 7 and (ii) first registers the start mark (step S12). This mark is a mark for identifying the start of machining in a certain machining section.

In the example illustrated in FIG. 2A, the first machining section of the workpiece WA is a section corresponding to a region L that is close to the origin of the x-axis, in other words, that is located nearest to the left. The start mark is registered when processing is performed at the left end of the region L.

Subsequently, the processor 11 sequentially accumulates the data supplied from the NC device 7 in the main storage 12 (step S13).

Subsequently, the processor 11 determines whether accumulation of data for one machining section is completed (step S14). In the example illustrated in FIG. 2A, since the machining section 3 L of the workpiece WA is divided into three machining sections L, the processor 11 determines whether the machining reaches the right end of each machining section L. If the accumulation of data for one process section is not completed (No in step S14), the process returns to step S13.

On the other hand, if the accumulation of data for one process section is completed or if the processor 11 receives, via a manual instruction, an instruction to end the machining (Yes in step S14), an end mark is stored (step S15), data on the one machining section can be identified, and data on the one machining section from the start mark to the end mark is transmitted to the data management controller 2 (step S16). In the example illustrated in FIG. 2A, in the first machining section L, at a time when the machining is performed at the right end of the first machining section L, the end mark is registered, and all the data included in the one machining section L is transmitted to the data management controller 2.

Subsequently, the processor 11 determines whether the machining process is completed (step S17). If the machining process is not completed (No in step S17), the process returns to step S12 to collect data for a next machining section.

On the other hand, if the machining process is completed (Yes in step S17), the process is completed.

The determination as to whether the machining process is completed is made by determining whether the machining is performed for all of the machining sections, that is, in the example illustrated in FIG. 2A, whether the machining reaches the right end of a section L that is farthest from the origin of the x-axis in the machining section 3 L, that is, a section located nearest to the right.

As described above, in the form illustrated as an example in FIG. 2B, the current value indicating the current supplied to the main spindle motor 93, the vibration data indicating a degree of a vibration of the main spindle motor 93, and the temperature data indicating the temperature of the main spindle motor 93 are supplied from the data collector 10 to the data management controller 2 for each of the machining sections.

As illustrated in FIG. 2A, since the section 3 L includes the three machining sections, the above-described data are supplied to the data management controller 2, for each machining section, at each time when the machining reaches the right end of the region L corresponding to each of the machining sections. In this example, the data set illustrated in FIG. 2B is divided into three portions and the three portions are supplied one by one.

In the learning process, the processor 21 of the data management controller 2 stores, in the auxiliary storage 23, the data supplied via the communicator 26. Subsequently, the processor 21 extracts feature amounts from the collected data. The feature amounts are, for example, the same kinds of NC machining data collected in one machining section such as, for example, the maximum value, the minimum value, the average value, the standard deviation, the numerical range, the machining time, the integral value and the like of the current value.

The processor 21 transmits, to the data analysis controller 3 via communicator 26, each of the extracted feature amounts, for example, each of the feature amounts extracted from the NC machining data of the portions corresponding to the regions L located at the left, the center, and the right in FIG. 2B, together with the ID of the machining process and the ID of the machining section.

In the learning process, the processor 31 of the data analysis controller 3 stores, in the auxiliary storage unit 33, the feature amounts supplied from the data management controller 2 via the communicator 36.

Also, the processor 11 of the data collection controller 1 transmits, to the data analysis controller 3, the NC processing data collected by the data collector 10 via the communicator 16. The processor 31 of the data analysis controller 3 stores the supplied NC machining data in the auxiliary storage 33.

On the other hand, when the machining of the workpiece WA is completed, a user attaches the machined workpiece WA to the machining quality measurement apparatus 4, measures dimensions of the workpiece WA for each of the machining sections L, and transmit, to the data analysis controller 3, measured data on the measurement.

The processor 31 of the data analysis controller 3 receives the transmitted data via the inputter 34 and temporarily stores the transmitted data in the auxiliary storage 33.

Figure 6:
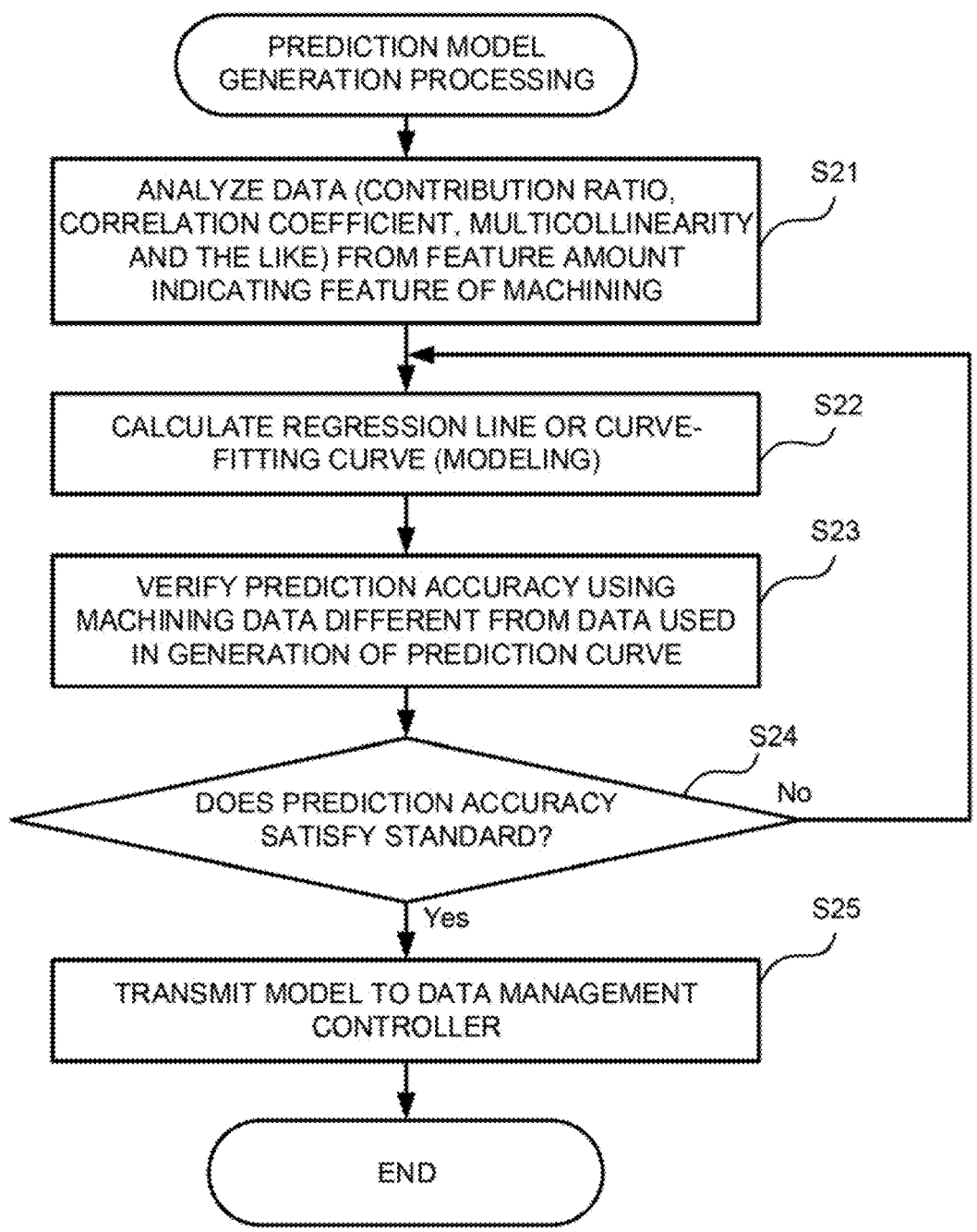
FIG. 6 is a flow chart illustrating prediction model generation processing performed by the data analysis controller illustrated in FIG. 1.

When the processor 31 completes the reception of feature amount data of the feature amounts and the measured data, the processor 31 starts the prediction model generation processing illustrated in FIG. 6. First, the processor 31 (i) removes an abnormal value from feature amounts indicating features of machining and (ii) performs analysis processing of calculating data such as a contribution ratio, a correlation coefficient and multicollinearity (step S21).

Next, the processor 31 calculates a regression line or a curve-fitting curve and performs modeling for generating a prediction model (step S22).

In this embodiment, a regression equation is used as the prediction model, and the least square method is used as a method for obtaining the regression equation. The least squares method is a method for determining such coefficients that minimize the sum of squared residuals so that a supposed function is a good approximation to the measured values when pairs of numerical values obtained by measurement are approximated using a function.

The regression equation to be obtained is specifically expressed as follows.

$$y = Ax_1 + Bx_2 + Cx_3 + \ldots + Nx_n$$

where, the symbol y denotes a target variable, the symbols $x_k$ (k=1, 2, ..., n) denote explanatory variables, and the symbols A, B, C, ..., N are coefficients for the respective explanatory variables.

In this embodiment, the explanatory variable $x_1$ is set to be a feature amount of a drive current value measured by the current sensor S1, the explanatory variable $x_2$ is set to be a feature amount of the vibration data measured by the vibration sensor S2, and the explanatory variable $x_3$ is set to be a feature amount of the temperature data measured by the temperature sensor S3.

Also, the target variable y is set to be a difference between a design value of and a measured value of the groove depth D of the workpiece WA based on the example illustrated in FIG. 2A.

The processor 31 performs a regression analysis on a regression equation $y = a\, x_1 + b\, x_2 + c\, x_3$ to calculate the coefficients a, b and c that best fits the feature amounts ($x_1$, $x_2$, $x_3$) extracted from a plurality of NC machining data.

The processor 31 obtains a regression equation for each process section of the machining process, that is, for each of the machining sections corresponding to the three regions L in FIG. 2A.

In the present embodiment, modeling is performed based on feature amounts collected in real time. However, the modeling may be performed based on feature amount data collected in the past and stored in the main storage 32 or the auxiliary storage 33.

The processor 31 (i) calculates an accuracy of the generated prediction model, that is, an prediction accuracy in a case of application to the regression equation, using NC machining data different from the NC machining data used at the time of generation of the prediction model in step S22 and (ii) verifies the accuracy. (Step S23).

The processor 31 determines whether the prediction accuracy calculated in step 23 satisfies a standard (step S24).

If the processor 31 determines that the prediction accuracy does not satisfy the standard (No in step S24), the process returns to step S22.

If the processor 31 determines that the prediction accuracy satisfies the standard (Yes in step S24), the processor 31 transmits, to the data management controller 2, the obtained model, in this case, the coefficients a, b, and c of the regression equation (step S25). The processor 21 of the data management controller 2 stores the received model in the auxiliary storage 23 in association with the machining process and the machining section.

In this way, a prediction model for predicting a machining dimension or a machining quality in a situation of an actual machining process is achieved.

This learning process is executed at a freely-selected frequency for each machining process.

The processor 31 (i) calculates, for each regression equation obtained in step S22, the contribution ratio of the correlation, that is, a ratio of the contribution of each explanatory variable $x_k$ to the target variable y and (ii) uses a multiple correlation coefficient R to obtain an accuracy of the contribution ratio.

For example, if the explanatory variables only include a drive current (k=1), the obtained accuracy of the contribution ratio is an index indicating how accurately a relationship between the current value $x_1$ of the main spindle motor 93 and a difference from the design value of the groove depth D of the workpiece WA is reflected by the ratio.

Accordingly, when the accuracy of the contribution ratio is determined to be not sufficient, explanatory variables, selection of feature amounts, a method for extracting feature amounts, and the like can be reconsidered, and erroneous determination of the prediction quality can be prevented.

Next, a process for predicting a machining dimension or machining quality using a prediction model in a situation of an actual machining process is described with reference to FIG. 7.

In a case in which the workpiece WA is machined with the NC device 7, the processor 71 controls the machine tool in accordance with the set numerical information to machine the workpiece. The processor 71 transmits data obtained by the sensors S1 to S3 to the data collection controller 1 in parallel with the machining of the workpiece.

The data collector 10 organizes the supplied data and transmits the organized data to the data management controller 2.

Figure 7:
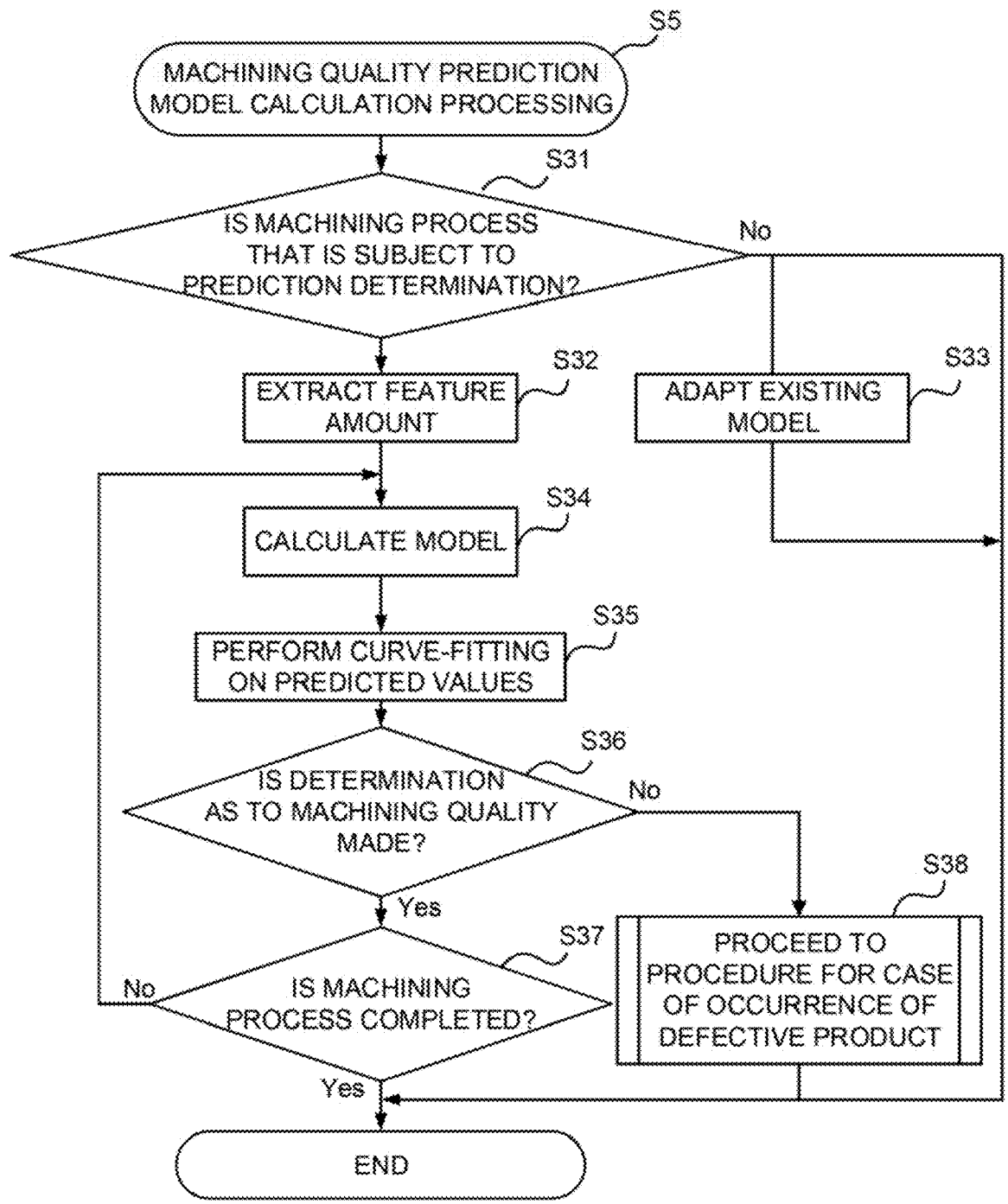
FIG. 7 is a flow chart illustrating machining quality prediction model calculation processing performed by the data management controller illustrated in FIG. 1.

On the other hand, the processor 21 of the data management controller 2 (i) executes machining quality prediction model calculation processing illustrated in FIG. 7 and (ii) first determines whether the current machining process is a machining process that is subject to prediction determination (step S31).

When the processor 21 determines that the current machining process is a machining process subject to the prediction determination (Yes in step S31), the processor 21 extracts the feature amounts (step S32).

When the processor 21 determines that the current machining process is not a machining process subject to the prediction determination (No in step S31), if there is an existing model, the processor 21 adopts the existing model (step S33). The computation process ends if there is no existing model.

Subsequent to the extraction of the feature amounts, the processor 21 (i) applies NC machining data newly received from the NC control unit 70 to the regression equation as a prediction model in order to predict a machining quality at that time and (ii) obtains a machining quality y predicted at that time (step S34).

Specifically, the processor 31 (i) substitutes the variable $x_1$=drive current value, $x_2$=vibration data, the variable $x_3$=the temperature data extracted from the NC machining data for the regression equation $y = a\ x_1 + b\ x_2 + c\ x_3$ and (ii) predicts the machining quality y, that is, the absolute value of the difference between the design value and the predicted dimension.

Additionally, prediction and determination of a previous machining prediction value and machining quality y of the same object to be predicted are performed until a deviation from a difference from a dimension tolerance occurs in the curve-fitting curve (step S35).

The processor 31 refers to the machining dimension quality regulation predetermined for each machining process and determines whether the predicted machining quality y satisfies the standard (step S36).

If the processor 31 determines that the predicted machining quality y satisfies the standard (Yes in step S36), the processor 31 determines whether the machining process is completed (step S37).

If the machining process is not completed (No in step S37), the process returns to step S34 for machining for the next section.

On the other hand, if the machining process is completed (Yes in step S37), the process is terminated.

Also, if the processor 31 determines that the predicted machining quality y does not satisfy the standard (No in step S36), the process proceeds to a procedure performed when a defective product occurs (step S38).

For example, the processor 21 instructs the NC device 7 to interrupt the machining process and generate an alarm indicating the occurrence of a defective product for the purpose of notification.

By executing the above-described steps, quality of the final processing dimensions can be predicted during the machining of the workpiece WA, that is, before the machining of the workpiece WA is completed.

In this embodiment, the processor 31 of the data analysis controller 3 obtains the regression equation as a prediction model in steps S32 and S34. However, if an existing prediction model suitable for the object to be predicted and determined is stored in the data management controller 2, the prediction by the processor 21 may use the prediction model stored in the main storage 22 or the auxiliary storage 23 without using the data analysis controller 3 to make a determination of the machining quality.

As described above, by using (i) a well-established method for analysis such as multiple regression analysis and (ii) a less computationally intensive method such as substitution into a regression equation for prediction, high-speed and stable analysis and prediction can be performed at high speed as compared with the use of complex methods such as neural network, fuzzy theory, and deep learning.

Additionally, according to the machine tool machining dimensions prediction device 100, the machining quality prediction model is not updated during the machining of the workpiece WA or the machining conditions are not changed during the machining. Accordingly, the machining quality of the workpiece WA can be more stably predicted as compared with a case in which a machining condition is dynamically changed during machining.

In addition, during the machining of the workpiece WA, the data collection controller 1 feeds back a prediction result to the machining apparatus 90, thereby also enabling execution of control by which machining dimensions predicted to have a narrow margin relative to the quality regulation are kept within the quality regulation. As a result, the processing defect in which the machining dimensions of the workpiece WA deviate from the quality standard can be prevented, thereby enabling a reduction of frequency at which the workpiece WA is wasted due to defective machining.

Also, in FIG. 7, one type of NC machining data is illustrated for easy understanding. However, a large number of NC machining data may be processed in parallel. Since each NC processing data includes section information, confusion between data used for the data collection controller 1, the data management controller 2 and the data analysis controller 3 does not occur.

Embodiment 2

The timing of tool change can be also determined based on a machining quality obtained by the machining dimensions prediction device 100. Embodiment 2 for determining the timing of tool change is described below.

Figure 8A:
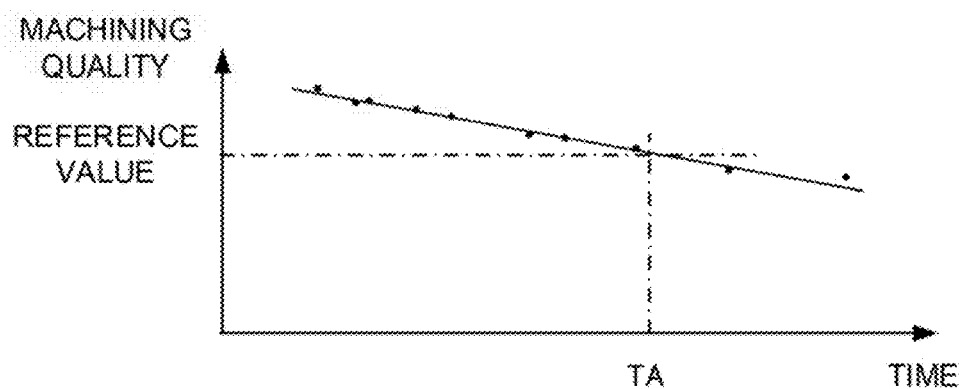
FIG. 8 is an explanatory view for illustrating a tool change time of Embodiment 2 of the present disclosure, (A) is a view illustrating an example in which reduction in machining quality is proportional to an elapsed time, (B) is a view illustrating an example in which reduction in machining quality is gradual as time passes, and (C) is a view illustrating an example in which reduction in machining quality is steep as time passes.
Figure 8B:
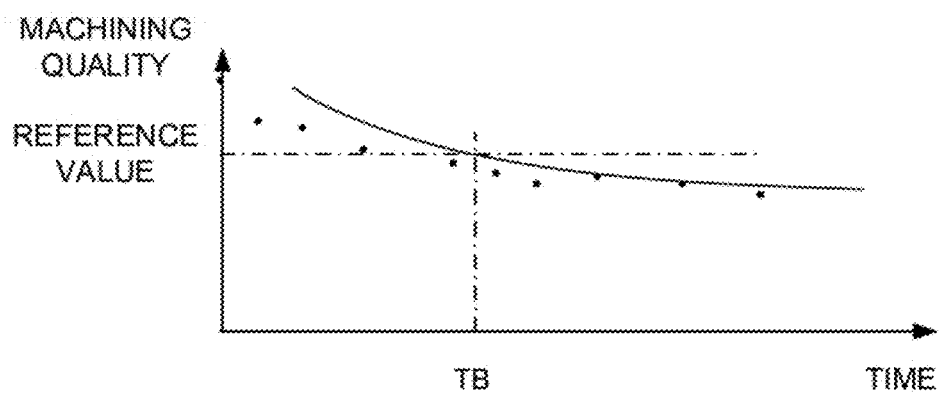
Figure 8C:
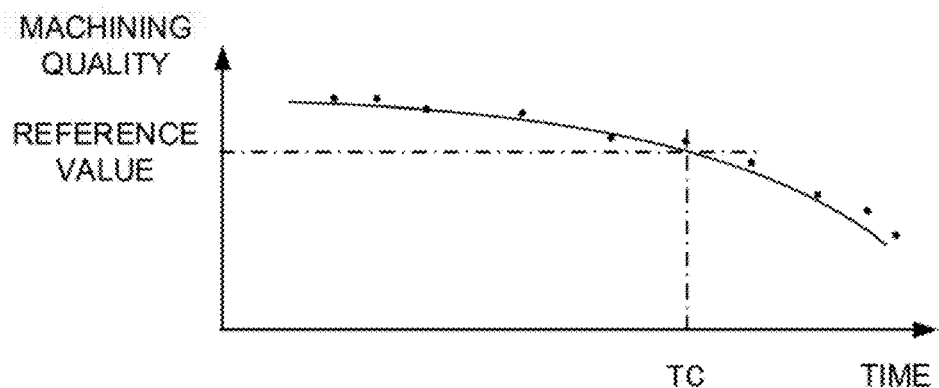

In the present embodiment, as illustrated in FIG. 8, the processor 21 of the data management controller 2 obtains a straight line expressing the relationship between the series of predicted processing qualities and elapsed time using a least square method or the like.

The processor 21 (i) specifies the timing at which the curve-fitting curve including the obtained straight line intersects with a dimensional tolerance and (ii) notifies this timing as the timing of tool change.

Specifically, when the curve-fitting curve is a straight line, as illustrated in (A) of FIG. 8, since a deterioration of the machining quality is proportional to the elapsed time, the machining quality is less than a reference value at a time TA.

Also, the curve-fitting curve may be a curve in which a change in the processing quality becomes gradual as time passes as illustrated in (B) of FIG. 8 or becomes steep as illustrated in (C) of FIG. 8.

In these cases, the machining quality is less than the reference value in a time TB or TC.

Additionally, curve-fitting curves of the present embodiment are not limited to the curves illustrated in (A) to (C) of FIG. 8 and may be expressed by a more complicated function. The curve-fitting curves of the present embodiment are not limited to the above-described examples as long as the curve-fitting curves can reproduce NC machining data better.

As a result, an operator can know the timing of tool change in advance. For example, the data management controller 2 supplies, to the data collection controller 1 via the communicator 26, data on a period remaining until the timing of tool change. When the data collection controller 1 receives this data, the data collection controller 1 commands the NC control unit 70 connected via the external connection I/F 73 to display, on the NC operation panel 82, "the number of remaining times that machining can be performed is 10 times", "remaining period during which machining can be performed is 10 hours", and the like.

The timing of the notification may be earlier or later by a fixed period than specified timing.

Embodiment 3

Next, a machine tool equipment abnormality determination device 200 according to Embodiment 3 of the present disclosure is described.

In addition to a function of predicting machining quality, the equipment abnormality determination device 200 has a function of predicting the timing of a change of equipment of tools of a machine tool and determining abnormality in the equipment.

Figure 9:
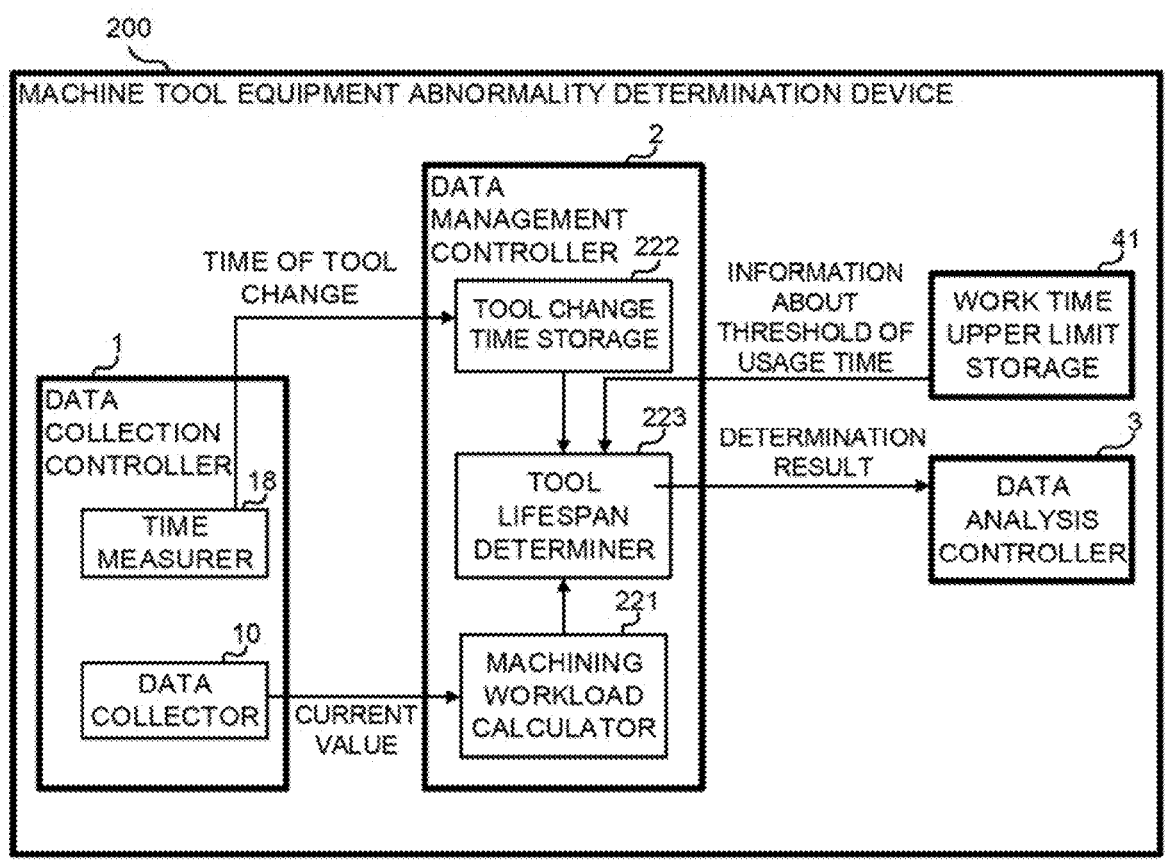
FIG. 9 is a functional block diagram of a machining tool equipment abnormality determination device according to Embodiment 3 of the present disclosure.

As illustrated in FIG. 9, the machine tool equipment abnormality determination device 200 includes a work time upper limit storage 41 in addition to the data collection controller 1, the data management controller 2, and the data analysis controller 3. The work time upper limit storage 41 stores upper limit values of workloads of tools, in other words, thresholds serving as a reference for determining whether to stop continuing to use the tools beyond the thresholds.

The data collection controller 1 (i) includes a time measurer 18 that measures the current time and (ii) notifies the data management controller 2 of a date and time when a tool of the NC device 7 is changed.

The data management controller 2 includes (i) a machining workload calculator 221 that calculates a workload from the driving energy data during an operation of the machine tool, which is NC machining data, for example, the drive current of the main spindle motor 93, (ii) a tool change time storage 222 that stores the date and time when a tool for machining the workpiece WA is changed, and (iii) a tool lifespan determiner 223 that determines a lifespan of the tool.

The work time upper limit storage 41 stores an upper limit B of a workload for each type of the tools. The upper limit B is determined based on an actual value, data provided by a tool manufacturer, a simulation result, and the like and is set by a user.

The data collection controller 1 determines, from output data of the NC device 7, whether a tool is changed. When the data collection controller 1 determines that the tool is changed, the data collection controller 1 sets, in the tool change time storage 222 of the data management controller 2, a date and time measured by the time measurer 18.

In response to the update of the date and time of the tool change, the tool lifespan determiner 223 resets an accumulated value A of workloads stored inside to zero.

As in Embodiment 1, during the process in which the NC device 7 machines the workpiece WA, the data collection controller 1 collects state data and supplies the current value of the main spindle motor 93 to the machining workload calculator 221.

Figure 10:
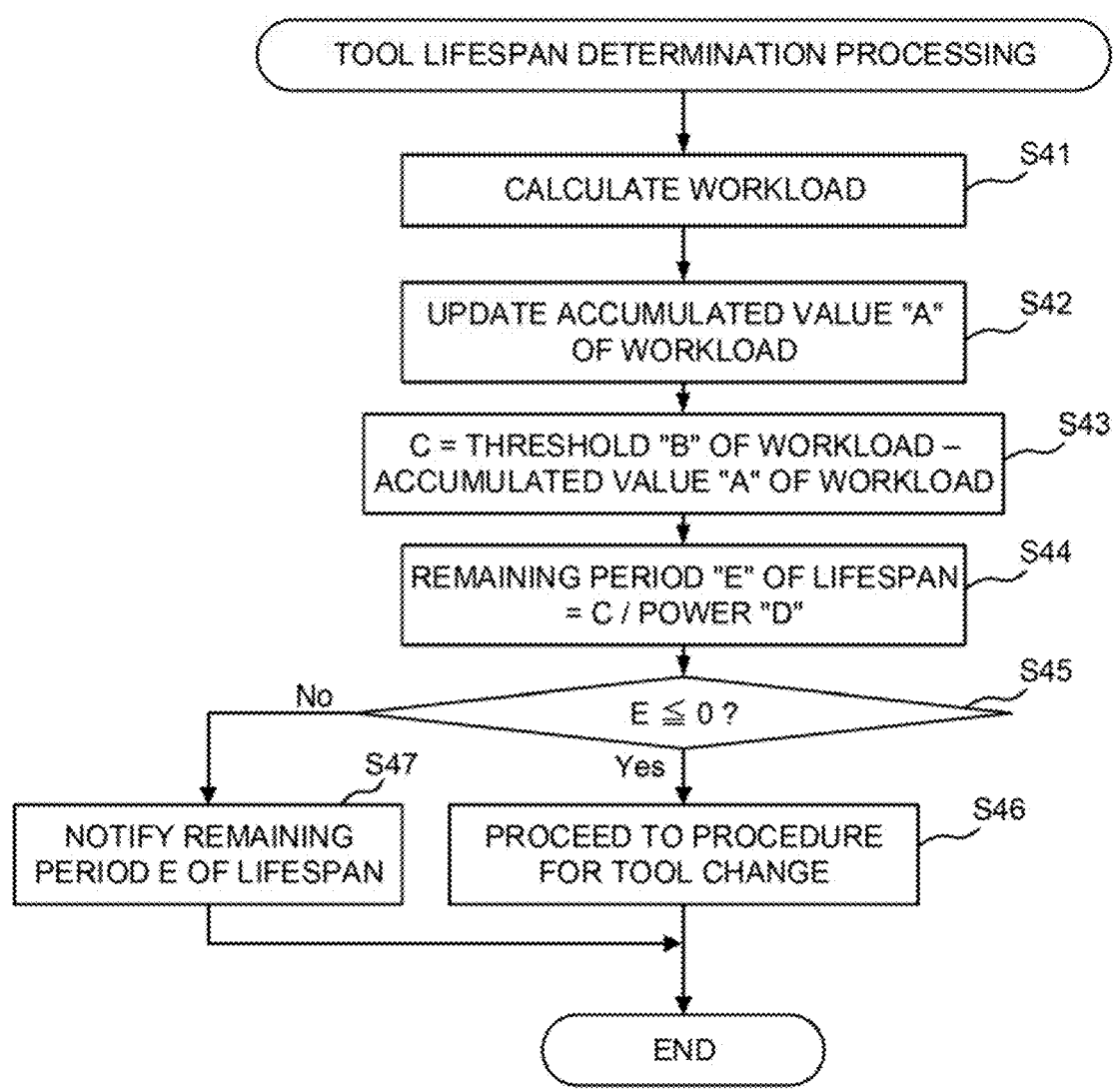
FIG. 10 is a flow chart illustrating tool lifespan determination processing performed by the machine tool equipment abnormality determination device illustrated in FIG. 9.

Upon receiving the current value, the processor 21 of the data management controller 2 starts tool lifespan determination processing illustrated in FIG. 10. First, using the current value provided from the data collector 10, a workload of work performed by the tool is obtained (step S41).

More specifically, the drive current of the main spindle motor 93 is approximately proportional to a load applied to the blade. Accordingly, the workload is assumed to be proportional to the sum of the drive currents of the main spindle motor 93 during machining, and the workload is expressed by an equation (1).

$$\text{Workload} = k1 \times \Sigma(\text{drive currents of the main spindle motor during machining}) \quad (1)$$

where the symbol k1 denotes a proportional coefficient.

If the current value can be measured continuously, the sum Σ of the discrete values may be replaced with an integral.

The machining workload calculator 221 (i) adds the obtained workload to the accumulated value A of workloads and (ii) updates the accumulated value (step S42).

Next, the tool lifespan determiner 223 obtains a difference C between (i) the accumulated value A of the workload of work performed by the tool and (ii) the upper limit value B of the workload of the tool stored in the threshold storage 41 (step S43). The difference C is a value that expresses how much longer a tool that is in use can be used.

Next, the processor 21 obtains power D of the current tool. The power D of the tool is proportional to the drive current value of the main spindle motor 93 at that time. Accordingly, the power D is expressed by the following equation.

$$D = k2 \times (\text{drive current of the main spindle motor 93})$$

k2: Coefficient

In addition, in a rotational motion, the power is proportional to a value obtained by multiplying torque T (N·m) by a rotational frequency n (rpm). The rotational frequency n of the main spindle is set to be an optimum rotational frequency. The coefficient k2 is set in advance in consideration of this optimum rotational frequency.

Next, the processor 21 calculates a remaining life period E, which is a remaining period until the tool lifespan, by dividing the difference C by the power D of the tool as follows (step S44).

$$E = C/D$$

Next, a determination as to whether the period E is 0 or less is made (step S45). If the period E is 0 or less (Yes in step S45), since the tool already reaches the end of tool's life, and thus the process is shifted to a procedure for changing the tool (step S46).

On the other hand, if the period E is larger than 0 (No in step S45), the remaining life period E is notified (step S47).

As described above, according to the machine tool equipment abnormality determination device 200 according to Embodiment 3, the lifespan of the tool is determined together with the machining quality prediction of the workpiece WA, and thus the timing of tool change and machining operation time are optimized.

Accordingly, the loss cost due to the abnormality of the tool can be reduced. That is, since a planned stop and planed maintenance of the equipment is possible, the equipment can be prevented from being stopped for a long time or from operating in an abnormal manner.

Embodiment 4

In the above-described embodiments, an example in which one NC device 7, one data collection controller 1, one data management controller 2, and one data analysis controller 3 are provided is described. However, the numbers of the NC devices 7, the data collection controllers 1, the data management controllers 2, and the data analysis controllers 3 are freely selected. For example, one data management controller 2 can be appropriately arranged in a plurality of NC devices 7 in consideration of the efficiency and speed of data processing.

Figure 11:
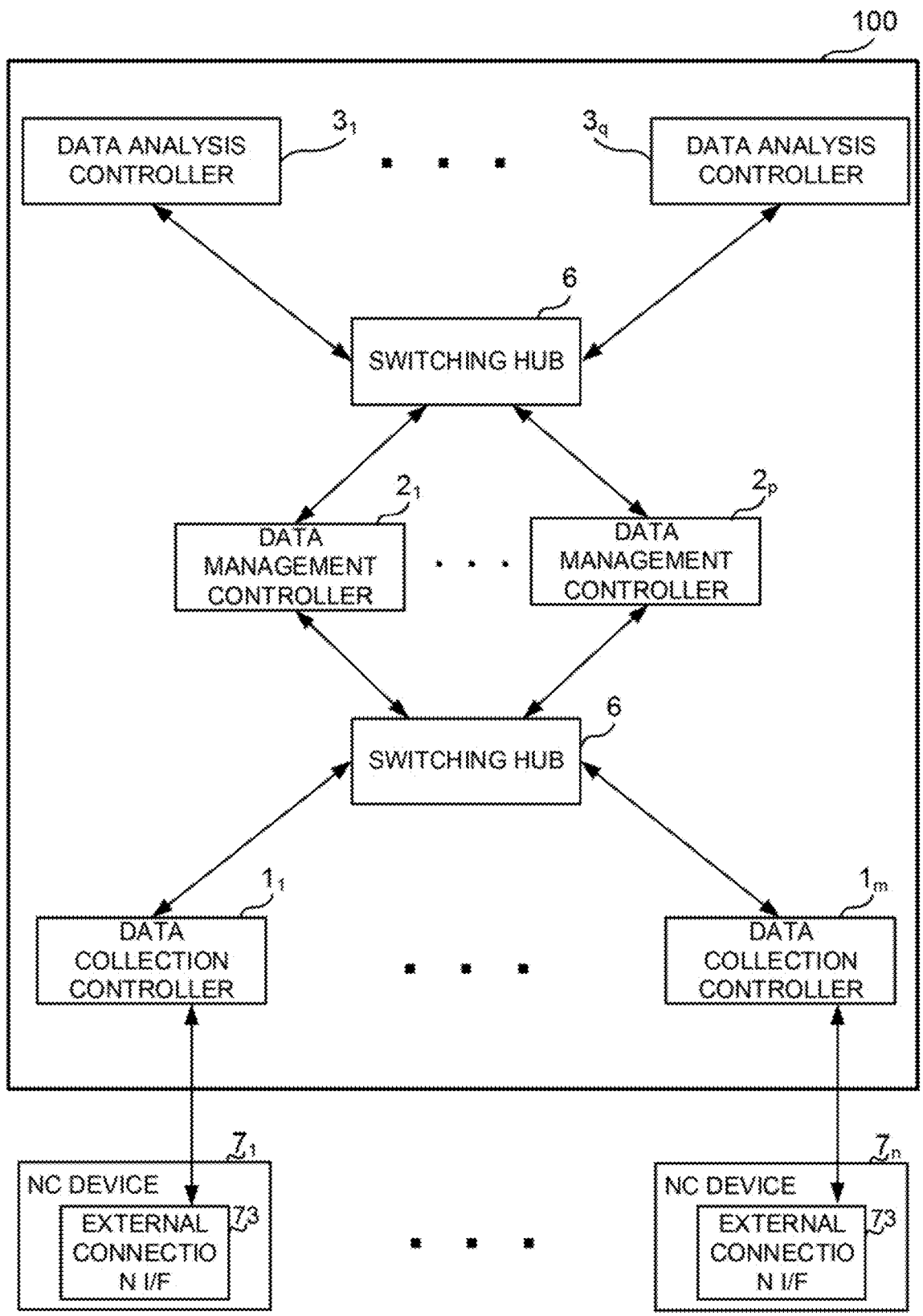
FIG. 11 is a functional block diagram of a machining dimensions prediction device according to Embodiment 4 of the present disclosure.

For example, as illustrated in FIG. 11, in n NC devices $7_1$ to $7_n$, data collection controllers $1_1$ to $1_m$ may be arranged, p data management controllers $2_1$ to $2_p$ may be arranged, and q data analysis controllers $3_1$ to $3_q$ may be arranged. In this case, the numbers n, m, p, and q are freely-selected positive integers.

In the case of the configuration illustrated in FIG. 11, the n data collection controllers $1_1$ to $1_m$ are connected to the p data management controllers $2_1$ to $2_p$ via a switching hub 6 by a network, and the p data management controllers $2_1$ to $2_p$ are connected to the q data analysis controllers $3_1$ to $3_q$ via another switching hub 6 by the network.

According to this configuration, which of the NC devices 7 a machining process is performed in and which of the data management controllers 2 and which of the data analysis controllers 3 perform the machining process in that NC device 7 are determined in advance, and in accordance with the determination, data may be transmitted and received to be processed.

According to such a configuration, at least one of the data collection controllers $1_1$ to $1_m$, at least one of the data management controllers $2_1$ to $2_p$, and at least one of the data analysis controllers $3_1$ to $3_q$ perform computer programs suitable for the respective controllers, thereby also enabling achievement of the above-described processes.

Additionally, the connection method illustrated in FIG. 11 is merely an example, and the data collection controllers 1, the data management controllers 2, and the data analysis controllers 3 may be connected to one another without using the switching hubs 6.

As described above, according to Embodiments 1 to 4, in addition to the above-described effects: (1) prediction and diagnosis of a machining quality, that is, (1-1) prevention of abnormality of the machining quality, (1-2) stabilization of the quality of the workpiece, and (1-3) early removal of a product having defective dimensions; and (2) diagnosis of a lifespan of a tool, specifically, determination of the timing of toll change according to the lifespan of the tool, (3) prevention and diagnosis of main spindle abnormality and (4) support for improvement of takt time are also realized.

The above description is made under the premise that a type of the NC device 7 that presses, against the stationary workpiece WA, a tool to be rotated to perform cutting is used. However, embodiments of the present disclosure are not limited to this configuration.

The present disclosure is also applicable to, for example, (i) a machine tool that machines, by a fixed tool, a workpiece WA that is rotationally driven, (ii) a type of machine tool that presses the workpiece WA against a rotationally driven tool while moving the stationary workpiece WA to cut or grind the workpiece WA, or (iii) a type of machine tool that presses a rotationally driven workpiece WA against a rotationally driven tool to cut or grind the workpiece WA.

Also, although the drive current value of the main spindle motor 93 is mainly described as an example of the feature amounts, the feature amounts are not limited to such a drive current value. The feature amounts may be a rotational frequency and torque with which a drive device that rotates a tool or a workpiece in the same machining section rotates. In this case, the term, "period", means a time period separated by a change in reproducible data or a trigger signal from a start of machining to an end of machining. For example, a time period corresponding to each of the three sections L obtained by dividing sections 3 L illustrated in FIG. 2A corresponds to the period. However, the period is not limited to such a time period and may be separated by different machining processes. Alternatively, the period may be a time period obtained by uniform separation or separation by freely-selected interval within the same machining process. Also, the feature amounts may be a drive current value, vibration in a direction perpendicular to an axis of rotation, a rotational frequency used for movement in a stationary state or in a rotational state, and torque.

Additionally, among data on the drive current collected at multiple points in time, the feature amounts may be extracted from collected data for each designated time from the start of machining, such as a maximum value, a minimum value, an average value, standard deviation, value range, machining time, integration, and the like in collected data in the same machining section.

The machining method, the data structure and the like illustrated in FIGS. 2 A and 2B are merely examples for easy understanding and can be changed as appropriate.

In the context of the present disclosure, a machine-readable media may be freely-selected tangible medium that can retain or store a program in an instruction execution system, instruction execution equipment or an instruction execution apparatus or for the purpose of the use in connection with the instruction execution system, the instruction execution equipment or the instruction execution apparatus. The machine readable media may be a machine readable signal medium or a machine readable recording medium. The machine-readable media include electronic, magnetic, optical, electromagnetic, infrared and semiconductor systems, equipment or devices and a freely-selected suitable combination of the foregoing devices. However, the machine-readable media are not limited to such examples. More specific examples of machine readable recording media include electrical connections with one or more wires, portable computer diskettes, hard disks, random access memory (RAM), read only memory (ROM), erasable programmable read-only memory (EPROM or flash memory), optical fiber, portable compact disk read only memory (CD-ROM), optical storage device, magnetic storage device, and a freely-selected suitable combination of the foregoing devices.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Data collection controller
2 Data management controller
3 Data analysis controller
4 Machining quality measurement apparatus
6 Switching hub
7 NC device
8 Inspection device
10 Data collector
11, 21, 31 Processor
12, 22, 32 Main storage
13, 23, 33 Auxiliary storage
14, 24, 34 Inputter
15, 25, 35 Outputter
16, 26, 36 Communicator
17, 27, 37 Bus
18 Time measurer
41 Work time upper limit storage
70 NC control unit
71 Processor
72 Storage
73 External connection OF
74 Operation panel OF
75 Main spindle control OF
76 Servo control I/F
77 Digital inputter
78 Digital outputter
81 Automatic program generation device
82 NC operation panel
83 Display
84 Operation key
85 Main spindle amplifier
86 Servo amplifier
90 Machining apparatus
91 Main spindle
92 Tool
93 Main spindle motor
94 Table
95 Moving mechanism
96$x$, 96$y$, 96$z$ Servo motor
100 Machine tool machining dimensions prediction device
200 Machine tool equipment abnormality determination device
211 Feature amount extractor
212 Instantaneous prediction value calculator
213 Machining quality predictor
214 Machining quality determiner
221 Machining workload calculator
222 Tool change time storage
223 Tool lifespan determiner
311 Data analyzer
312 Machining quality prediction model generator

The invention claimed is:

1. A machine tool machining dimensions prediction device comprising:
a memory that stores computer-readable instructions:
a processor coupled to the memory, the computer-readable instructions, when executed by the processor, cause the processor to
acquire driving state information about a driving state, the driving state information including (i) data indicating a machining section in which machining is currently performed, the machining section being among two or more machining sections of a workpiece, and (ii) data indicating a state of a tool attached to the machine tool;
extract a feature amount from the driving state information;
find, based on the feature amount, a parameter correlating the feature amount for each of the machining sections with a difference between a design value and a measured value of a machining dimension of the workpiece to be machined by the machine tool;
generate a prediction model that outputs a difference between the design value and the measured value of the machining dimension of the workpiece when the feature amount is input into the prediction model;
(i) input the feature amount to the prediction model generated during machining of the workpiece and (ii) calculate instantaneous prediction dimension information that is a difference between the design value and the measured value of the machining dimension of the workpiece; and
calculate, based on (i) the data that indicates the machining section in which the machining is currently performed and (ii) the instantaneous prediction dimension information, section predication dimension information that is the difference between the design value and the measured value of the machining dimension of the workpiece at a time at which a process for the machining performed in the machining section is finished; and
feedback the section predication dimension information to the machining tool to cause the machining tool to maintain the measured machining dimension of the workpiece within the design value.

2. The machine tool machining dimensions prediction device according to claim 1, wherein
the prediction model is a regression equation that uses, as a target variable, a difference between a design value of and a measured value of the machining dimension and uses, as an explanatory variable, the feature amount.

3. The machine tool machining dimensions prediction device according to claim 1, wherein
the memory stores a machining condition for the workpiece for each of the machining sections; and
the computer-readable instructions further cause the processor to
generate, based on information on the machining condition stored in the memory, the driving state information, and the prediction model, final predication dimension information that is a predicted value of the machining dimension of the workpiece at a time at which processes performed in all the machining sections are finished, and
(i) compare the final predication dimension information generated with quality regulation information including quality tolerance of quality of the machining dimension of the workpiece and (ii) determine that the quality of the workpiece meets a standard when the final prediction dimension information is within the quality tolerance.

4. The machine tool machining dimensions prediction device according to claim 1, wherein
the memory stores a machining condition for the workpiece for each of the machining sections; and
the computer-readable instructions further cause the processor to
generate, based on information on the machining condition stored in the memory, the driving state information, and the prediction model, final predication dimension information that is a predicted value of the machining dimension of the workpiece at a time at which processes performed in all the machining sections are finished; and
compare the final predication dimension information with quality regulation information including quality tolerance of quality of the machining dimension of the workpiece and (ii) determine that the quality of the workpiece meets a standard when the final prediction dimension information is within the quality tolerance, wherein the prediction model is a regression equation that uses, as a target variable, a difference between a design value of and a measured value of the machining dimension and uses, as an explanatory variable, the feature amount.

5. A machine tool equipment abnormality determination device comprising:
the machine tool machining dimensions prediction device according to claim 1; and
a processor that, upon execution of computer-readable instructions, is configured to
calculate, from the driving state information, a workload of work performed on the workpiece by the tool;
store, in a memory, an upper limit value of the workload of work performed on the workpiece by the tool; and
compare the upper limit value with a cumulative value of a workload of work performed on the workpiece by the tool and determine that the tool reaches an end of a lifespan of the tool when a value obtained by subtracting the cumulative workload from the upper limit value is equal to or less than zero.

6. The machine tool machining dimensions prediction device according to claim 1, wherein the data indicating the state of a tool attached to the machine tool includes at least one of a drive current of a main spindle motor, vibration data, and temperature data.

7. The machine tool machining dimensions prediction device according to claim 6, wherein the processor, upon execution of the computer-readable instructions, is configured to obtain the vibration data and the temperature data from a vibration sensor attached to the main spindle motor and a temperature sensor attached to the main spindle motor, respectively.

8. The machine tool machining dimensions prediction device according to claim 1, wherein the data indicating the machining section in which machining is currently performed includes at least one of a process identifier indicating a start time of machining on the machining section, an identifier of the machining section, and a start mark.

9. The machine tool machining dimensions prediction device according to claim 1, wherein the processor, upon executing the computer-readable instructions, is further configured to learn a relationship between the state of a tool attached to the machine tool and a machining quality of the workpiece.

10. The machine tool machining dimensions prediction device according to claim 9, wherein the relationship between the state of a tool attached to the machine tool and a machining quality of the workpiece is used to generate the prediction model.

11. A machine tool machining dimensions prediction system comprising:
a data collection controller comprising a processor that, upon execution of computer-readable instructions, is configured to
acquire driving state information about a driving state, the driving state information including (i) data that indicates a machining section in which machining is currently performed, the machining section being among two or more machining sections of a workpiece, and (ii) data indicating a state of a tool attached to the machine tool;
a data management controller comprising a processor that, upon execution of computer-readable instructions, is configured to extract a feature amount from the driving state information; and a data analysis controller comprising a processor that, upon execution of computer-readable instructions, is configured to find, based on the feature amount, a parameter correlating the feature amount for each of the machining sections with a difference between a design value and a measured value of a machining dimension of the workpiece to be machined by the machine tool, generate a prediction model to output a difference between the design value and the measured value of the machining dimension of the workpiece when the feature amount is input into the prediction model, (i) input the feature amount to the prediction model during machining of the workpiece and (ii) calculate instantaneous prediction dimension information that is a difference between the design value and the measured value of the machining dimension of the workpiece, calculate, based on (i) the data that indicates the machining section in which the machining is currently performed and (ii) the instantaneous prediction dimension information, section predication dimension information that is a difference between the design value and the measured value of the machining dimension of the workpiece at a time at which a process for the machining performed in the machining section is finished, and feedback the section predication dimension information to the machining tool to cause the machining tool to maintain the measured machining dimension of the workpiece within the design value.

12. A machine tool machining dimensions prediction method executed by a machine tool machining dimensions prediction device, the method comprising:

acquiring, by a processor, driving state information about a driving state, the driving state information including (i) data that indicates a machining section in which machining is currently performed, the machining section being among two or more machining sections of a workpiece, and (ii) data indicating a state of a tool attached to the machine tool;

extracting, with the processor, a feature amount from the driving state information;

finding, with the processor and based on the extracted feature amount, a parameter correlating the feature amount for each of the machining sections with a difference between a design value and a measured value of a machining dimension of the workpiece to be machined by the machine tool;

generating, with the processor, a prediction model outputting the difference between the design value and the measured value of the machining dimension of the workpiece when the feature amount is input into the prediction model;

inputting, with the processor, the feature amount to the prediction model generated during machining of the workpiece, and calculating instantaneous prediction dimension information that is the output difference between the design value and the measured value of the machining dimension of the workpiece;

calculating, with the processor and based on (i) the data that indicates the machining section in which the machining is currently performed and (ii) the generated instantaneous prediction dimension information, section predication dimension information that is the difference between the design value and the measured value of the machining dimension of the workpiece at a time at which a process for the machining performed in the machining section is finished; and feeding back, with the processor, the section predication dimension information to the machining tool to cause the machining tool to maintain the measured machining dimension of the workpiece within the design value.

* * * * *